US008804660B2

(12) United States Patent
Liao

(10) Patent No.: US 8,804,660 B2
(45) Date of Patent: Aug. 12, 2014

(54) RESOURCE RESERVATION DURING HANDOVER IN A WIRELESS COMMUNICATIONS SYSTEM

(75) Inventor: Jingyi Liao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 629 days.

(21) Appl. No.: 12/665,535

(22) PCT Filed: Jun. 5, 2008

(86) PCT No.: PCT/CN2008/001096
§ 371 (c)(1),
(2), (4) Date: Dec. 18, 2009

(87) PCT Pub. No.: WO2008/154802
PCT Pub. Date: Dec. 24, 2008

(65) Prior Publication Data
US 2010/0189074 A1 Jul. 29, 2010

Related U.S. Application Data

(60) Provisional application No. 60/944,896, filed on Jun. 19, 2007.

(51) Int. Cl.
H04W 36/00 (2009.01)
(52) U.S. Cl.
CPC .................. *H04W 36/0011* (2013.01)
USPC .......................................... 370/331; 455/436
(58) Field of Classification Search
CPC ...................... H04W 36/0011; H04W 36/0016
USPC ........................... 370/331; 455/436–439, 442
See application file for complete search history.

(56) References Cited

U.S. PATENT DOCUMENTS

| 6,016,311 | A  | * | 1/2000  | Gilbert et al. ............... 370/280 |
| 6,526,039 | B1 | * | 2/2003  | Dahlman et al. ............. 370/350 |
| 7,433,321 | B2 | * | 10/2008 | Grilli et al. .................. 370/252 |
| 2002/0065089 | A1 | * | 5/2002  | Soliman ...................... 455/502 |
| 2005/0143072 | A1 |   | 6/2005  | Yoon et al. |
| 2005/0265321 | A1 | * | 12/2005 | Rappaport et al. ........... 370/352 |
| 2007/0004437 | A1 | * | 1/2007  | Harada et al. ................ 455/506 |
| 2007/0070943 | A1 | * | 3/2007  | Livet et al. .................. 370/329 |
| 2007/0173256 | A1 | * | 7/2007  | Laroia et al. ................ 455/436 |
| 2007/0243874 | A1 | * | 10/2007 | Park et al. ................... 455/442 |
| 2007/0293224 | A1 | * | 12/2007 | Wang et al. ................. 455/436 |

(Continued)

FOREIGN PATENT DOCUMENTS

| CN | 1236279 A | 11/1999 |
| CN | 1280753 A | 1/2001 |

(Continued)

OTHER PUBLICATIONS

ETSI Technical Specification 125 402 version 7.1.0 Release 7, Universal Mobile Telecommunications System (UMTS): Synchronization in UTRAN; Stage 2 (Sep. 2006): pp. 30-40.*

Primary Examiner — Benjamin Lamont
(74) Attorney, Agent, or Firm — Coats & Bennett, PLLC

(57) ABSTRACT

A serving base station provides time slot allocation information to a target base station for a mobile station that will likely undergo handover. The target base station uses the time slot allocation information to determine when resources should be reserved to facilitate the handover of the mobile station.

27 Claims, 8 Drawing Sheets

(56) References Cited

U.S. PATENT DOCUMENTS

2007/0298802 A1* 12/2007 Kaminski .................. 455/436
2008/0084849 A1* 4/2008 Wang et al. ............... 370/332
2008/0233916 A1* 9/2008 Wang et al. ............. 455/404.2
2008/0267131 A1* 10/2008 Kangude et al. ............ 370/331

FOREIGN PATENT DOCUMENTS

| CN | 1658699 A | 8/2005 |
| CN | 1917701 A | 2/2007 |
| JP | 2002300628 A | 10/2002 |
| WO | 2007038129 A1 | 4/2007 |

* cited by examiner

RESOURCE RESERVATION DURING HANDOVER IN A WIRELESS COMMUNICATIONS SYSTEM

RELATED APPLICATIONS

This application claims priority from U.S. Provisional Patent Application Ser. No. 60/944,896 filed Jun. 19, 2007. The '896 application, which is entitled "Improved Resource Reservation During Handover in a Wireless Communications System," is incorporated herein by reference in its entirety.

TECHNICAL FIELD

The present invention relates generally to handover in wireless communication networks, and particularly to improving the utilization of system resources during handover.

BACKGROUND

Mobile users generally travel between first and second cells in a wireless network. To maintain the quality of a communication connection, the mobile station may be "handed-off" from one base station to another. That is, a serving base station located in the first cell may hand over the connection to a target base station located in the second cell. The target base station may establish a new connection for the mobile user, without any user intervention required.

The handover typically requires the serving and target base stations, and the mobile station undergoing handover, to perform a sequence of actions. These actions may include, but are not limited to, changing the radio channel over which the mobile station can send traffic and exchanging signaling messages. Such actions may interrupt the transmission of data frames between the mobile station and the base stations. Handover processes also require allocating system resources to the mobile station at the target base station. Non-limiting examples of these resources include time slot assignments, frequency allocations, and quality-of-service (QoS) assurances.

There are many concerns regarding the handover of a mobile station between the serving and target base stations; however, the handover drop probability is a key parameter in any measurement of connection-level quality-of-service (QoS) in a wireless network. Minimizing the handover drop probability is often an important objective in the wireless system design.

Various resource reservation schemes have been proposed to reduce the probability of dropped handovers, and to ensure acceptable QoS during and after handover. Examples of such schemes are described in U.S. Pat. No. 7,092,719 and U.S. Patent Application Publication No. 2003/0078046. These references disclose reserving resources exclusively for handover purposes in cells that the mobile station is likely to visit when the mobile station, or an application executed by the mobile station, has been "guaranteed" a certain level of service. These reserved resources can only be used by the corresponding mobile station or application. Another example is the adaptive resource allocation for managing QoS in wireless networks as discussed by Gakhar et al., in "Dynamic Resource Reservation in IEEE 802.16 Broadband Wireless Networks", 14th IEEE International Workshop on Quality of Service, June 2006, and by Huang et al., in "Adaptive Resource Allocation for Multimedia QoS Management in Wireless networks", IEEE Transactions on Vehicular Technology, Vol. 53, No. 2, March 2004.

On one hand, reserving the resources in anticipation of a possible handover can improve the handover drop performance. On the other hand, however, it excludes other mobile stations and applications from using those resources. That is, other calls or other multimedia data sessions cannot use the resources that are reserved for the handover of a mobile station, even if the mobile station does not actually use the for handover.

SUMMARY

The present invention provides a system and method of improving the reservation of resources at a potential target cell during handover to that cell. More specifically, a serving base station and a target base station exchange uplink/downlink time slot allocation information whenever a mobile station undergoes handover to the target base station. If the base station has the knowledge of the mobile station's uplink/downlink time slot allocation at the serving base station, the target base station will be able to predict an accurate time estimate for the handover delay.

In one embodiment, a serving base station comprises, inter alia, a transceiver and a controller. The transceiver facilitates voice and/or data communications between the user of the mobile station and one or more remote parties. From time to time, the user's mobile station may undergo handover from a serving base station to a target base station. When a handover is probable, the controller sends channel allocation information to the potential target base station. The channel allocation information indicates a current time slot allocation at the serving base station for the mobile station.

The target base station also comprises a transceiver and a controller. The controller at the target base station receives the time slot allocation information from the serving base station, and predicts a handover delay. The handover delay may include, for example, the air transmission time between the mobile station and the target base station, the time needed by the network and/or the mobile station to process the handover, or both. Once predicted, the target base station may reserve resources for the handover without utilizing additional, unneeded resources. Moreover, the information permits the resources to be reserved only for the time that they are actually needed.

DETAILED DESCRIPTION

The present invention provides a system and method of accurately estimating handover delay to improve resource allocation performance. Given an accurate estimate of when a handover will be completed, a target cell can start reserving resources for handover calls only at a necessary time. That is, the target cell need not reserve resources for a mobile station undergoing handover until the target cell is certain that the mobile station will undergo handover, and that the target cell will receive the mobile station at the completion of handover.

Figure 1:
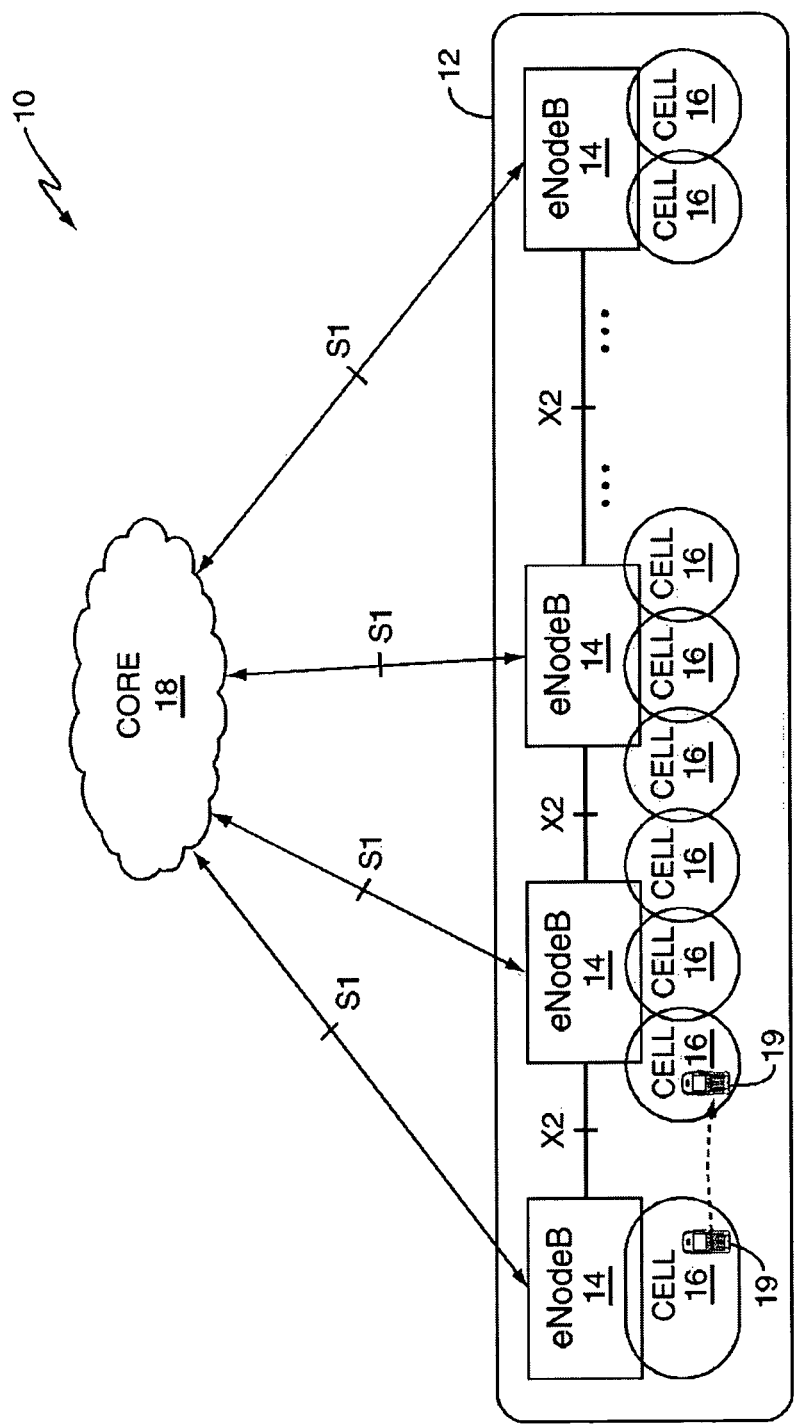
FIG. 1 is a block diagram illustrating some of the components of a wireless communication network suitable for use in one embodiment of the present invention.

FIG. 1 illustrates an overview of an exemplary wireless communications network 10 based on the Long Term Evolution (LTE) architecture. The network 10 comprises one or more LTE Radio Access Networks (RAN) 12 with its nodes and interfaces, and a Core Network (CORE) 18. The architecture of the LTE RAN 12 is well known in the art; however, a brief description of the LTE RAN 12, its nodes, and its interfaces, is included herein for clarity.

The LTE RAN 12 includes only one type of node—the eNodeB 14. Each eNodeB 14 is a Radio Base Station (RBS) that communicates with one or more mobile stations 19 in one or more cells 16 via an air interface. In operation, the eNodeB 14 performs the typical physical-layer functions required for communication with the mobile stations (MS) 19. Such functions include, but are not limited to, encoding/decoding, modulation/demodulation, and interleaving/de-interleaving. Additionally, the eNodeB 14 also performs the classical Radio Network Controller (RNC) functions, and therefore, may effect decisions regarding handover, radio resource allocation, and scheduling decisions for both uplink and downlink communications.

Each eNodeB 14 connects to the CORE 18 via an IP-based S1 interface. The CORE 18 is sometimes referred to as the Evolved Packet Core (EPC). The S1 interface carries both user traffic and signaling data between eNodeB 14 and CORE 18, and is similar to the Iu communication interface in an W-CDMA/HSPA network. An X2 communication interface connects each eNodeB 14 to another eNodeB 14 in a neighboring cell. Generally, the X2 interface carries signaling data to support active-mode mobility, but may also convey signaling, and Operations and Management (O&M) data to support radio resource management functions between the cells 16.

Figure 2:
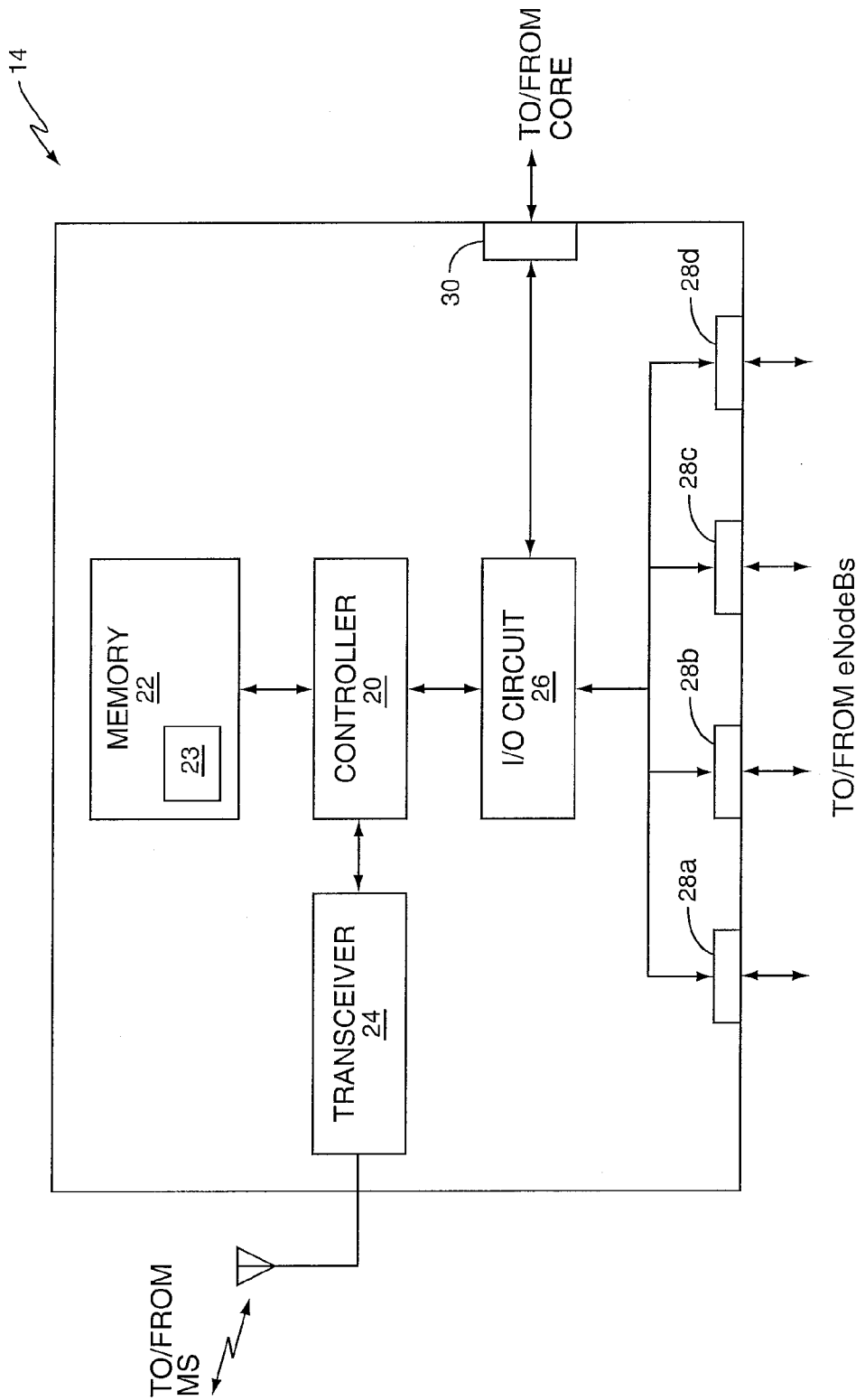
FIG. 2 is a block diagram illustrating some of the components of an eNodeB configured according to one embodiment of the present invention.

FIG. 2 is a block diagram that illustrates some of the main components of a typical eNodeB 14. As seen in FIG. 2, the eNodeB 14 comprises a controller 20, memory 22, a transceiver 24, an Input/Output (I/O) circuit 26, communication ports 28 to communicate with other eNodeBs 14, and a communication port 30 to communicate signals and data with CORE 18.

Controller 20 comprises one or more microprocessors that control the operation of the eNodeB 14 according to program instructions and data stored in memory 22. The control functions may be implemented in a single microprocessor, or in multiple microprocessors. Memory 22 may include both random access memory (RAM) and read-only memory (ROM). Executable program instructions and data required for operation of the eNodeB 14 are stored in non-volatile memory, such as EPROM, EEPROM, and/or flash memory, and may be implemented as discrete or stacked devices, for example. Memory 22 may also include a transmit buffer 23. Transceiver 24 comprises any transceiver known in the art that is capable of transmitting signals to, and receiving signals from, MS 19 via a known air interface. The I/O circuit 26 communicatively interfaces the controller 20 with the communication ports 28, 30.

Communication ports 28 are configured to communicate signals and data with one or more other eNodeB 14 via the X2 interface links. In this embodiment, the illustrated eNodeB 14 includes one port 28 for each of a plurality of adjacent eNodeB 14. These eNodeBs may be in the same cell as the illustrated eNodeB 14, in a neighbor cell, or a combination thereof. However, the illustration is for clarity only. The illustrated eNodeB 14 may have other communication port configurations to connect to the eNodeB 14.

The 3rd Generation Partnership Project (3GPP) is currently developing specifications for new wireless communications systems as part of its LTE initiative. The goals of LTE include providing very high peak data rates to mobile station users (up to 100 Mbps on the downlink, and up to 50 Mbps on the uplink). To achieve these goals, LTE employs advanced multiple access schemes, adaptive modulation and coding schemes, and advanced multi-antenna technologies. Additionally, currently planned LTE systems will also include a time-division-duplexing (TDD) mode.

Figure 3:
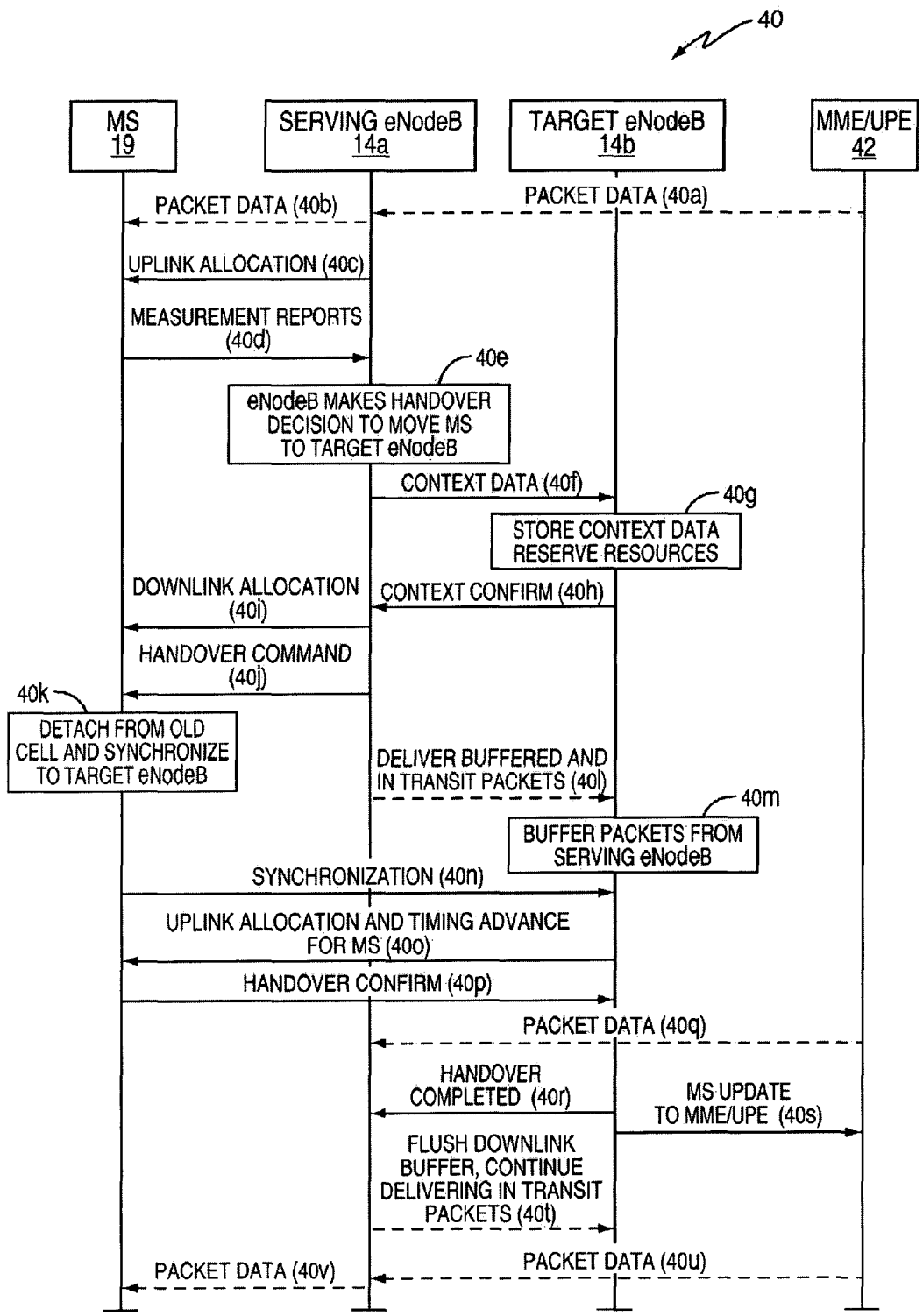
FIG. 3 illustrates a handover signaling sequence.

FIG. 3 illustrates a typical handover for such a TDD system. As shown in sequence 40 of FIG. 3, an MS 19 receives packet data and other signals from a serving eNodeB 14a and a Mobility Management Entity (MME)/User Plane Entity (UPE) (lines 40a, 40b). The serving eNodeB 14a provides the MS 19 with an uplink allocation (line 40c), which triggers the MS 19 to send measurement reports to the serving eNodeB 14a (line 40d). Based on these measurement reports, the serving eNodeB 14a may decide to handover the MS 19 to a target eNodeB 14b in an adjacent cell (line 40e).

To prepare the target eNodeB 14b for handover, the serving eNodeB 14a sends the target eNodeB 14b relevant context data for the MS 19 in a HANDOFF REQUEST message (line 40f). The target eNodeB 14b stores the context data in memory and reserves the necessary resources for handover (box 40g). The target eNodeB 14b then responds to the serving eNodeB 14a by confirming receipt of the context data (line 40h). The serving eNodeB 14a sends a downlink allocation to the MS 19 and a HANDOVER COMMAND message to the MS 19 (lines 40i, 40j). In response, the MS 19 detaches from the serving eNodeB 14a in the "old" cell and begins the synchronization process with the target eNodeB 14b (box 40k). Meanwhile, the serving eNodeB 14a forwards all buffered packets, and all packets that were in transit at the time of handover, to the target eNodeB 14b where they are stored (lines 40l, 40m).

The MS 19 synchronizes to the target eNodeB 14b (line 40n) and begins acquiring the uplink allocation and timing advance parameters (line 40o). These parameters will be used by the MS 19 to send a handover confirm message to the target eNodeB 14b, which completes handover procedure (line 40p). Once handover is complete, the MME/UPE provides packet data to the target eNodeB 14b (line 40q), and the target eNodeB 14b sends a HANDOVER COMPLETED message to the (old) serving eNode B 14a (line 40r) and to the MME/UPE 42 to update that entity (line 40s). In response, the serving eNodeB (line 40t) again flushes its buffer to the target eNodeB (line 40t), and the MME/UPE 42 can resume providing data to the MS 19 via the target eNodeB, which is now the serving eNodeB 14a (lines 40v, 40u).

Those skilled in the art will recognize that the above signaling sequence may be initiated with several target eNodeBs 14b at the same time. In other words, a serving eNodeB 14a may prepare several target eNodeBs 14b for a handover using steps 40a-40h as described above. Although several target eNodeBs 14b will therefore reserve resources in anticipation of handover, the MS 19 will be directed to only one of those target eNodeBs 14b. As previously stated, this can unnecessarily exclude other mobile stations and applications from using the resources at the target eNodeBs 14b not actually selected for handover.

More specifically, there is a handover delay associated with the air interface transmission in a TDD system that varies depending on when the serving eNodeB 14a initiates handover, and on the allocation of time slots between uplink and downlink channels at the serving and the target eNodeBs 14a, 14b. In situations where the allocation of time slots at the serving eNodeB 14a is unknown, then a detailed estimation of the handover delay is not possible. Similarly, it is difficult to efficiently reserve resource at the target cell to support handover operations in situations where the handover delay is varied and uncertain. Given such varied and uncertain delay, a target eNodeB 14b may reserve more resources than are necessary to maintain a desired Quality of Service (QoS). In other words, resources must be reserved early enough and long enough, to account for all of the possible variations in the handover delay.

The present invention addresses such situations by providing the target eNodeB 14b with the current uplink/downlink time slot allocation for the MS 19 at the serving eNodeB 14a. The target eNodeB 14b can use the current time slot allocation to predict the handover delay during handover. Knowing the handover delay will allow the target eNodeB 14b to determine when to reserve resources.

In more detail, the handover delay $T_{HO}$ has two parts—a process part and an air transmission part.

$$T_{HO} = T_{process} + T_{transmit} \quad (1)$$

$T_{process}$ represents the process part of the handover delay, and consists of the process delays in both the MS 19 and the communication network. This includes, for example, the delay associated with buffering the data packets in the transmit buffer 23, and forwarding the data packets in the transmit buffer 23 from the serving eNodeB 14a to the target eNodeB 14b. The network portion of $T_{process}$ tends to dominate the handover delay; however, if the transmit buffer 23 information is known, the network portion of the handover process delay $T_{process}$ can be estimated.

Figure 4:
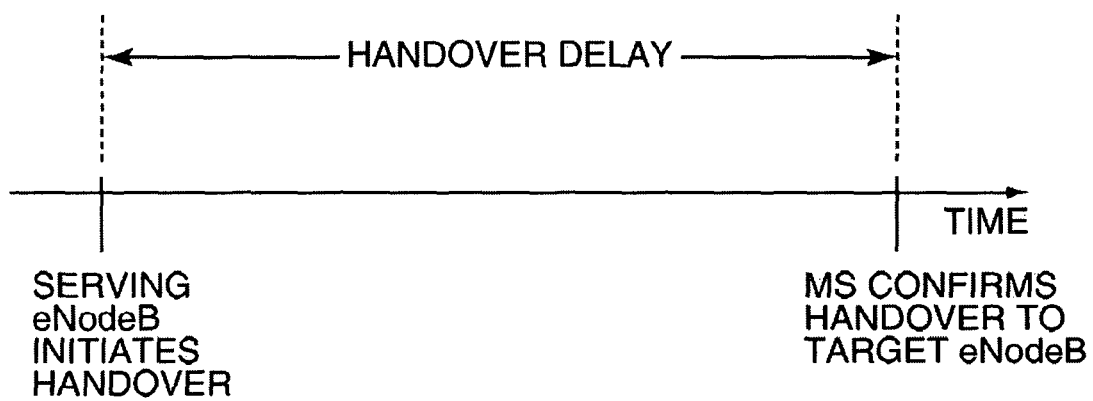
FIG. 4 illustrates the handover delay as the elapsed time between the initiation of the handover process and the confirmation of the handover to the target base station.

$T_{transmit}$ represents the delays caused by signal exchanges at the air interface level, including the downlink and uplink transmission delay of the handover signals between the MS 19 and the target eNodeB 14b. As seen in FIG. 4, the air transmission part of the handover delay is defined as the time between when the serving eNodeB 14a sends a HANDOVER COMMAND to the MS 19 (i.e., line 40j in FIG. 3), and when the MS 19 signals the target eNodeB 14b with a HANDOVER CONFIRM message (i.e., line 40p in FIG. 3). The target eNodeB 14b accurately estimates the elapsed time between those two messages as the air transmission part of the handover delay. This allows the target eNodeB 14b to plan resource reservation to efficiently utilize available resources and to improve handover success probability.

However, obtaining such accurate time delay estimation is difficult. For example, the uplink and downlink may be asymmetric, and LTE networks generally permit an unbalanced time slot allocation between uplink and downlink transmissions. Further, different cells may have inconsistent uplink/downlink time slot allocations since different cells may have different and asymmetrical traffic loads (e.g., such as in an asynchronous TDD system). Even in a semi-synchronized TDD system, where the same or synchronized time slot allocation is generally maintained for all cells, the time slot allocation between the uplink and downlink may vary over time. In such cases, the synchronized slot allocation is maintained by a synchronization procedure among all the cells.

Since the handover procedure is a fast procedure compared to the slow cell synchronization procedure, the uplink/downlink timing might be inconsistent in some cells when the handover occurs. Thus, inconsistent channel allocations (i.e., time slot allocations) between the serving cell and the target cell involved in a handover process could introduce timing and resource reservation problems.

Figure 5:
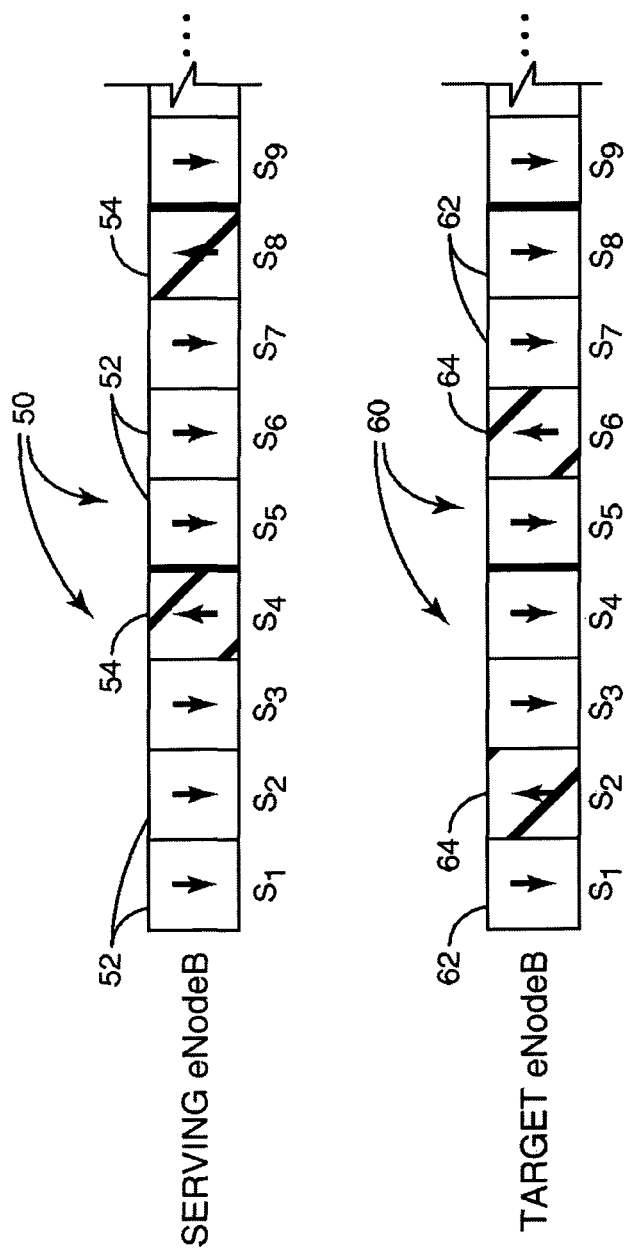
FIG. 5 illustrates how different uplink/downlink time slot allocations can effect handover timing.

FIG. 5 shows an example where the transmission part $T_{transmit}$ of the handover delay varies depending on the uplink/downlink slot allocation at the serving eNodeB 14a when it initializes a handover command. As seen in FIG. 5, the serving eNodeB 14a communicates with MS 19 using a plurality of superframes 50. Each superframe 50 comprises four time slots. The time slots in the plurality of superframes 50 are indicated here by $s_1$-$s_9$. Each superframe 50 includes one or more downlink time slots 52 and one or more uplink time slots 54. For clarity, a "down" arrow indicates downlink time slots 52 in which the serving eNodeB 14a transmits packets of data to the MS 19. An "up" arrow indicates the uplink time slots 54 in which the MS 19 transmits packets of data to the serving eNodeB 14a.

Similarly, the target eNodeB 14b can also communicate with MS 19 using a plurality of superframes 60. As above, each superframe 60 comprises four time slots with the plurality of superframes 60 having time slots indicated by $s_1$-$s_9$. Each superframe 60 may include one or more downlink time slots 62 (indicated using "down" arrows) and one or more uplink time slots 64 (indicated using "up" arrows).

The handover delay depends on when the serving eNodeB 14a initiates handover. Since the serving eNodeB 14a and target eNodeB 14b have inconsistent uplink/downlink allocations, the air transmission part $T_{transmit}$ of the handover delay will generally vary. That is, there is no fixed relationship between the uplink/downlink slot allocations at the serving eNodeB 14a and the target eNodeB 14b. However, according to the present invention, the target eNodeB 14b will be made aware of the uplink/downlink time slot allocation status of the serving eNodeB 14a. Therefore, the target eNodeB 14b can use this information to predict the air interface transmission part $T_{transmit}$ of the handover delay accurately.

For example, as seen in FIG. 5, target eNodeB 14b has been provided with the uplink/downlink time slot allocation for the serving eNodeB 14a. Thus, if the target eNodeB 14b knows that the serving eNodeB 14a will send the HANDOVER COMMAND message to the MS 19 in downlink time slot $s_1$, the target eNodeB 14b can predict that the MS 19 will send the HANDOVER CONFIRM message in the next uplink time slot $s_2$—a 1-slot delay. The target eNodeB 14b can therefore reserve the necessary resources in time for the handover.

On the other hand, if the target eNodeB 14b knows that the serving eNodeB 14a will send the HANDOVER COMMAND message to the MS 19 in downlink time slot $s_2$, then the target eNodeB 14b can predict that the MS 19 will send the HANDOVER CONFIRM message in uplink time slot $s_6$—a 4-slot delay. Immediately reserving the resources in this case undesirably prevents other MSs from using the resources during these 4 time slots. As such, the target eNodeB 14b need not immediately reserve resources for handover, but instead, can delay reserving the necessary handover resources until it knows that the MS 19 will confirm the handover.

The target eNodeB 14b can determine when the serving eNodeB 14a will send the HANDOVER COMMAND message to the MS 19 based on its own signaling to the serving eNodeB 14a, and on the knowledge of the uplink/downlink slot assignment at the serving eNodeB 14a. For example, as seen in FIG. 3, the HANDOVER COMMAND message sent by the serving eNodeB 14a to the MS 19 follows a CON- TEXT CONFIRM response message from the target eNodeB 14*b*. Knowing the uplink/downlink time slot allocation for the MS 19 at the serving eNodeB 14*a*, the target eNodeB 14*b* can then predict which downlink time slot the serving eNodeB 14*a* will send the HANDOVER COMMAND message to the MS 19 (e.g., the next downlink time slot after the target eNodeB 14*b* sends the CONTEXT CONFIRM message). Once that time slot is predicted, the target eNodeB 14*b* can then predict when the MS 19 will send the HANDOVER CONFIRM message to the target eNodeB 14*b*.

The exact timing of the issuance of the HANDOVER COMMAND message by the serving eNodeB 14*a* may depend on the status of the transmit buffer 23 at the serving eNodeB 14*a*. Therefore, according to one embodiment, the target eNodeB 14*b* is provided information about the status of the transmit buffer 23 to allow the target eNodeB 14*b* to more accurately predict when the serving eNodeB 14*a* will send the HANDOVER COMMAND message. Knowing when the serving eNodeB 14*a* will send this message will allow for a more accurate prediction of when the MS 19 will respond with a HANDOVER CONFIRM message.

Figure 6:
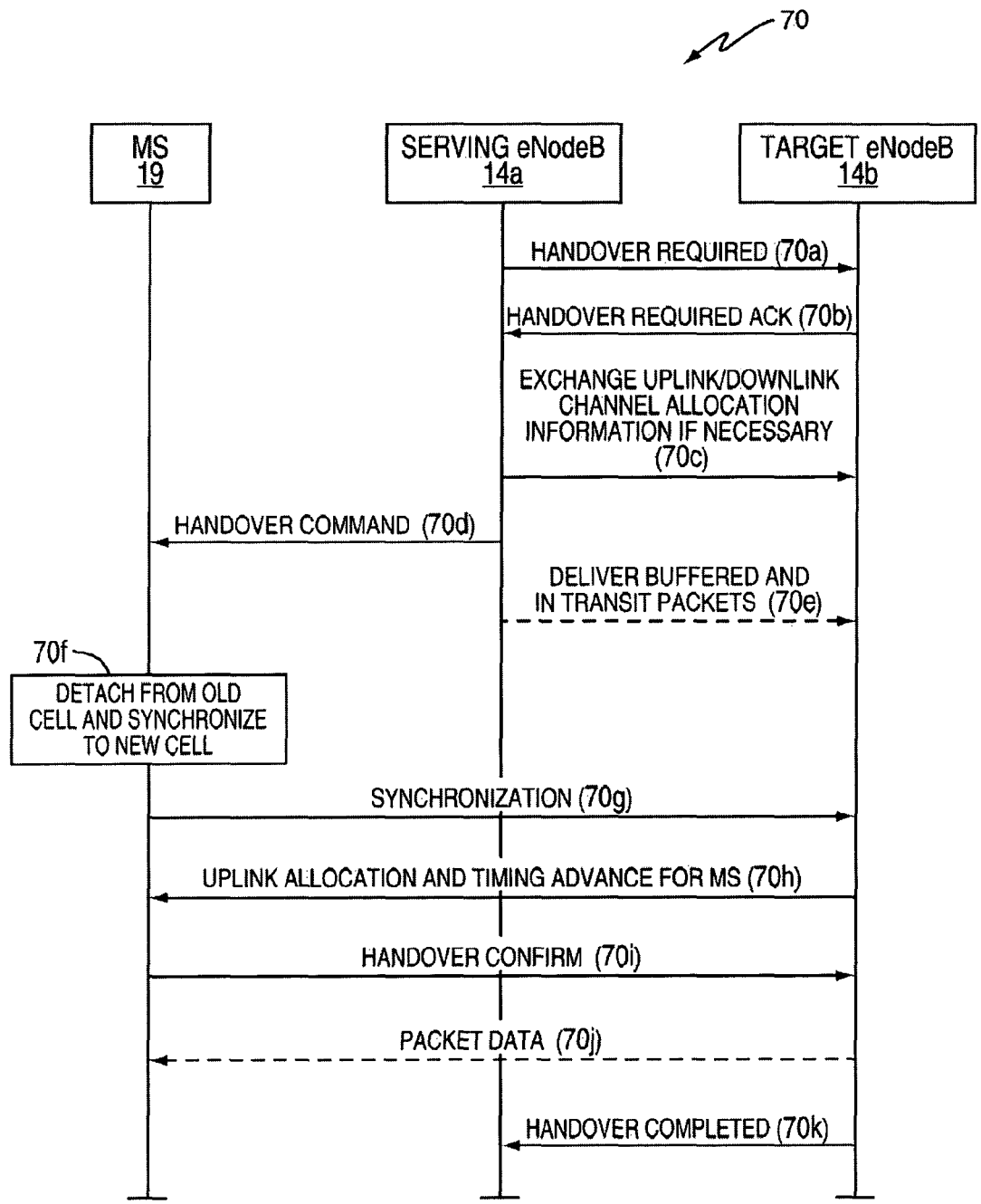
FIG. 6 illustrates a handover signaling sequence according to one embodiment of the present invention.

FIG. 6 illustrates a signaling sequence 70 in which the handover of MS 19 is conducted according to one embodiment of the present invention. Particularly, when the serving eNodeB 14*a* determines that handover will occur, it sends a handover required message to the target eNodeB 14*b* (line 70*a*). The target eNodeB 14*b* will respond with an acknowledgement message (line 70*b*). The serving eNodeB 14*a* then forwards the uplink/downlink channel allocation information to the target eNodeB 14*b* (line 70*c*). The channel allocation information carries the time slot allocation for the MS 19 at the serving eNodeB 14*a*. As described below in more detail, the target eNodeB 14*b* may already be aware of the time slot allocation at the serving eNodeB 14*a*. Therefore, the allocation information might only be sent if the target eNodeB 14*b* does not know the current time slot allocations at the serving eNodeB 14*a*.

The serving eNodeB 14*a* then sends the HANDOVER COMMAND message to the MS 19 (line 70*d*), and forwards any buffered and in-transit data packets to the target eNodeB 14*b* (line 70*e*). The MS 19 then detaches from the serving cell (box 700 and synchronizes to the target eNodeB 14*b* (line 70*g*). The target eNodeB 14*b* sends the uplink/downlink and timing advance information to the MS 19 as previously described (line 70*h*), and the MS 19 responds with a HANDOVER CONFIRM message (line 70*i*). Once confirmed, the target eNodeB 14*b*, now functioning as a serving eNodeB, sends packet data to the MS 19 (line 70*j*) and provides a HANDOVER COMPLETED message to the old serving eNodeB 14*a* (line 70*k*).

It should be noted that the serving and target eNodeBs may effect the exchange of the uplink/downlink time slot allocation information according to any means known in the art. In one embodiment, for example, the allocation information is exchanged in concert with other processes that are required to accomplish the handover process. In another embodiment, the uplink/downlink allocation information accompanies a typical data exchange between the serving and target eNodeBs.

Figure 7:
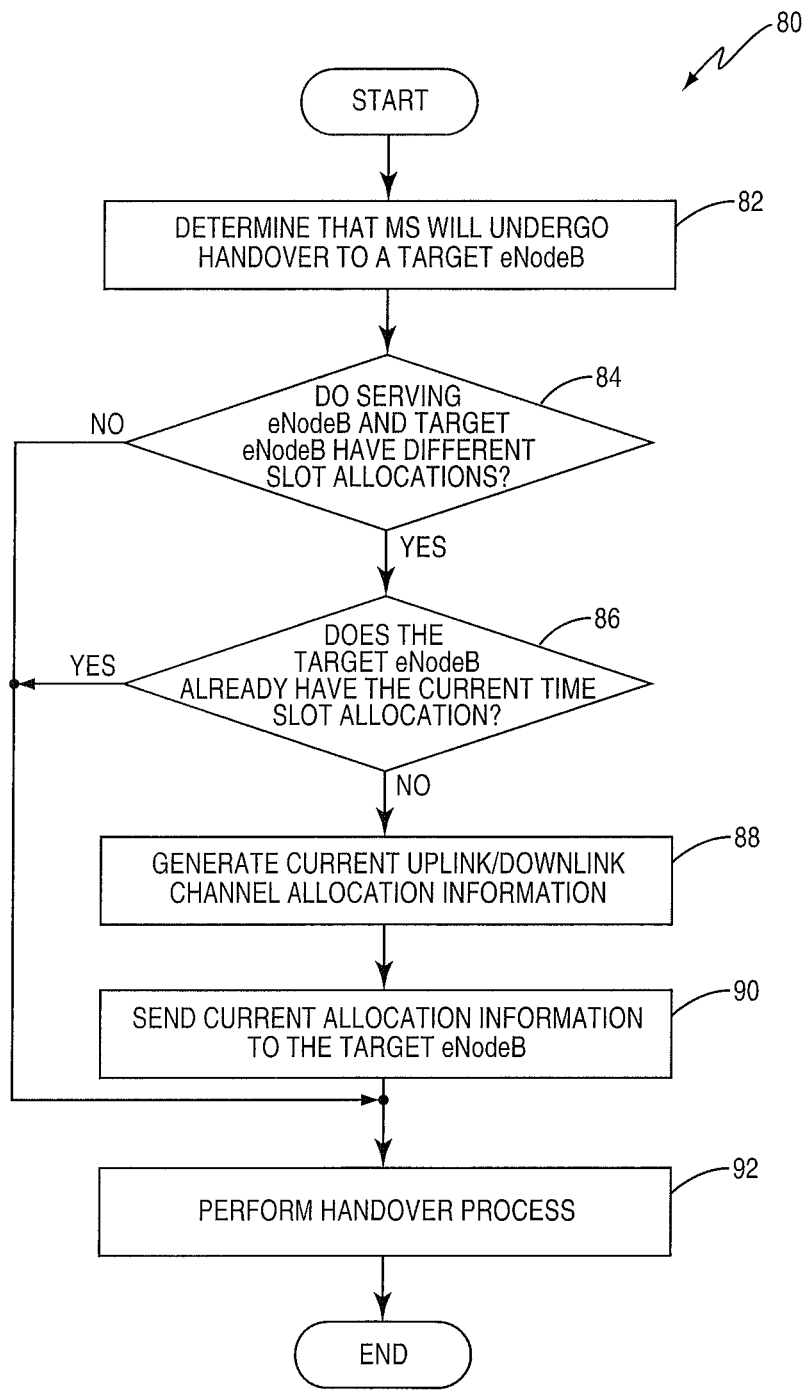
FIG. 7 is a flow diagram illustrating a method of performing handover according to one embodiment of the present invention.

FIG. 7 is a flow chart illustrating a method 80 in which a serving eNodeB 14*a* performs handover according to one embodiment of the present invention. In FIG. 7, the serving and target eNodeBs 14*a*, 14*b* regularly exchange the uplink/downlink time slot allocation information. However, the target eNodeB 14*b* may not always have the current time slot allocations for the serving eNodeB 14*a* at the time of handover. One example is a situation where the serving eNodeB 14*a* has adjusted its time slot allocation between uplink and downlink channels, but has not informed the target eNodeB 14*b* of the adjustment when handover begins. In these types of situations, the time slot allocation synchronization procedure has not been completed when handover is initiated. Therefore, as seen in FIG. 7, the serving eNodeB 14*a* may be triggered to send its current time slot allocation information to the target eNodeB 14*b* prior to handover.

Method 80 begins when the serving eNodeB 14*a* determines that the MS 19 will undergo handover operations to a target eNodeB 14*b* (box 82). The serving eNodeB 14*a* then determines whether the time slot allocation at the serving eNodeB 14*a* is the same or different as the time slot allocation at the target eNodeB 14*b* (box 84). If the time slot allocations are the same, the serving eNodeB 14*a* will simply initiate handover (box 92). If the time slot allocations are different, however, the serving eNodeB 14*a* will determine whether the target eNodeB 14*b* already has the time slot allocation that is currently in use (box 86). If so, the serving eNodeB 14*a* will initiate handover (box 92); otherwise, the serving eNodeB 14*a* will generate the uplink/downlink channel allocation information (box 88) and send it to the target eNodeB 14*b* (box 90) so that the target eNodeB may predict the handover delay prior to executing handover (box 92).

Figure 8:
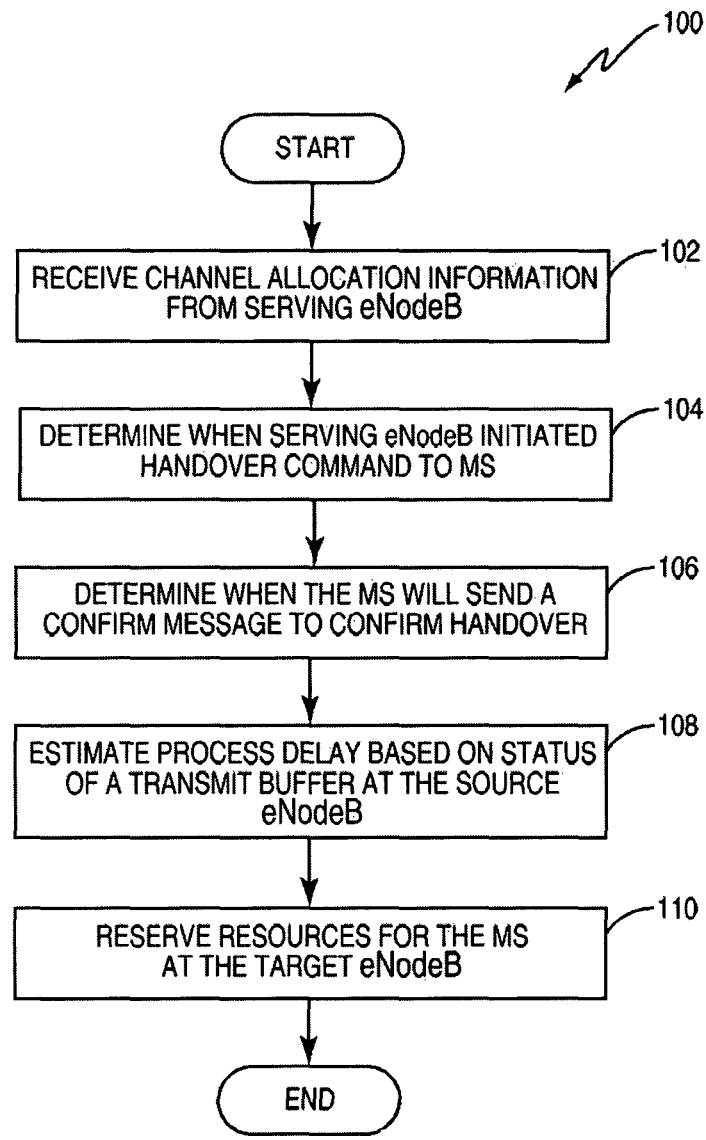
FIG. 8 is a flow diagram illustrating a method of performing handover according to one embodiment of the present invention.

FIG. 8 is a flow chart illustrating a method 100 in which a target eNodeB 14*b* performs handover according to one embodiment of the present invention. Particularly, the target eNodeB 14*b* performs the handover process upon receiving the allocation information from the serving eNodeB 14*a* (box 102). The target eNodeB 14*b* then determines when the serving eNodeB 14*a* initiated the HANDOVER CONFIRM to the MS 19 (box 104). Based on the uplink/downlink time slot allocation information, the target eNodeB 14*b* predicts when the MS 19 will send the HANDOVER CONFIRM message (box 106). The serving eNodeB 14*a* also estimates the process delay based on the status of the transmit buffer 23 at the serving eNodeB 14*a* (box 108), and reserves the resources for the MS 19 (box 110).

Therefore, according to the present invention, the serving and target eNodeBs exchange uplink/downlink channel allocation information when an MS 19 undergoes handover. Such an exchange allows a target eNodeB to obtain an accurate handover delay related to air interface transmission. This assists in the timing of handover processes and in resource reservation for MSs 19 that are undergoing handover. The information is used to reserve resources for the handover without utilizing additional, unneeded resources. Moreover, the information permits the resources to be reserved only for the time that they are actually needed. Thus, the probability of successful handovers may be maximized, not only for the MS 19 of interest, but also for other MSs 19, whether those MSs 19 are seeking initial access to the target cell, or are also handed over to the new cell. Thus, QoS in the wireless network may be optimized.

With these and other variations and extensions in mind, those skilled in the art will appreciate that the foregoing description and the accompanying drawings represent non-limiting examples of the methods and apparatus taught herein for improving the utilization of resources during handover of a mobile station in a wireless communications system. For example, although the present invention is described herein as applied to an LTE system, the methods and apparatus described are more broadly applicable to other types of communication networks.

Additionally, the present embodiments describe the present invention as exchanging the uplink/downlink time slot allocation information between serving eNodeBs and target eNodeBs. The transmission of such information may be in messages via direct X2 interface links between the serving and target eNodeBs, or via other nodes, such as Radio Network Controllers (RNC) and/or access GateWays (aGW).

As such, the present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of performing handover in a wireless communications system, the method comprising:
   determining whether a handover of a mobile station from a serving base station to a target base station is probable; and
   sending allocation information to the target base station, wherein the allocation information indicates which time slots are currently allocated for downlink transmission from the serving base station and which time slots are currently allocated for uplink transmission to the serving base station, wherein any given time slot is allocated for either uplink transmission to or downlink transmission from the serving base station, but not both, and wherein handover delay between the mobile station and the target base station is predicted using the allocation information.

2. The method of claim 1 wherein sending allocation information to the target base station comprises:
   determining whether the target base station has the current allocation of time slots for downlink transmission from and uplink transmission to the serving base station; and
   sending the allocation information if the target base station does not have that current allocation.

3. The method of claim 2 wherein sending allocation information to the target base station comprises:
   determining whether the current allocation of time slots for downlink transmission from and uplink transmission to the serving base station is different from a current allocation of time slots for downlink transmission from and uplink transmission to the target base station; and
   sending the allocation information if those current allocations are different.

4. The method of claim 1 wherein the allocation information comprises differences between the current allocation of time slots for downlink transmission from and uplink transmission to the serving base station and a previous allocation of time slots for downlink transmission from and uplink transmission to the serving base station.

5. The method of claim 1 further comprising generating the allocation information to indicate said current allocation as a difference between a current allocation of time slots for uplink transmission to the serving base station and a current allocation of time slots for downlink transmission from the serving base station.

6. The method of claim 1 wherein sending allocation information to the target base station comprises sending the allocation information in a handover request.

7. The method of claim 1 wherein the handover delay comprises an air transmission component and a processing component, and wherein the allocation information assists the target base station to determine which portion of the handover delay is associated with the air transmission component.

8. The method of claim 7 wherein the allocation information assists the target base station to determine which portion of the handover delay is associated with the processing component.

9. The method of claim 1, wherein said handover delay depends on when the serving base station initiates said handover.

10. A serving base station comprising:
    a transceiver configured to transmit signals to and receive signals from a mobile station over an air interface;
    a controller coupled to said transceiver and configured to:
       communicate with a target base station that will serve the mobile station after handover;
       determine whether a handover of the mobile station from the serving base station to the target base station is probable; and
       send allocation information to the target base station, wherein the allocation information indicates which time slots are currently allocated for downlink transmission from the serving base station and which time slots are currently allocated for uplink transmission to the serving base station, wherein any given time slot is allocated for either uplink transmission to or downlink transmission from the serving base station, but not both, wherein handover delay between the mobile station and the target base station is predicted using the allocation information, and wherein the controller comprises one or more processors that control the operation of the serving base station according to program instructions stored in memory.

11. The serving base station of claim 10 wherein the controller is further configured to:
    determine whether the target base station has the current allocation of time slots for downlink transmission from and uplink transmission to the serving base station; and
    send the allocation information if the target base station does not have that current allocation.

12. The serving base station of claim 11 wherein the controller is further configured to send the allocation information if the current allocation of time slots for downlink transmission from and uplink transmission to the serving base station is different from a current allocation of time slots for downlink transmission from and uplink transmission to the target base station.

13. The serving base station of claim 10 wherein the allocation information comprises differences between the current allocation of time slots for downlink transmission from and uplink transmission to the serving base station and a previous allocation of time slots for downlink transmission from and uplink transmission to the serving base station.

14. The serving base station of claim 10 wherein the controller is further configured to generate the allocation information to indicate said current allocation as a difference between a current allocation of time slots for uplink transmission to the serving base station and a current allocation of time slots for downlink transmission from the serving base station.

15. The serving base station of claim 10 wherein the controller is further configured to send the allocation information in a handover request.

16. The serving base station of claim 10 wherein the handover delay comprises an air transmission component and a processing component, and wherein the controller is further configured to generate the allocation information to assist the target base station in determining how much of the handover delay is associated with the air transmission component.

17. The serving base station of claim 16 wherein the controller is further configured to generate the allocation information to assist the target base station in determining how much of the handover delay is associated with the processing component.

18. A method of performing handover in a wireless communications system, the method comprising:
   receiving allocation information from a serving base station, the allocation information indicating which time slots are currently allocated for downlink transmission from the serving base station and which time slots are currently allocated for uplink transmission to the serving base station, wherein any given time slot is allocated for either uplink transmission to or downlink transmission from the serving base station, but not both;
   predicting a handover delay for a mobile station undergoing handover from the serving base station to a target base station, based on the allocation information; and
   reserving resources at the target base station, for use by the mobile station, based on the predicted handover delay.

19. The method of claim 18 wherein receiving allocation information from a serving base station comprises receiving the allocation information in a handover request.

20. The method of claim 18 wherein predicting the handover delay for the mobile station comprises predicting a processing component of the handover delay based on a status of a transmit buffer at the serving base station.

21. The method of claim 18 wherein predicting the handover delay for the mobile station comprises predicting an air transmission component of the handover delay by:
   determining a time slot in which the serving base station sent a handover command to the mobile station; and
   predicting a subsequent time slot in which the mobile station will confirm handover with the target base station based on the allocation information.

22. The method of claim 18, wherein said handover delay depends on when the serving base station initiates said handover.

23. A target base station comprising:
   a transceiver to communicate signals with a mobile station undergoing handover from a serving base station;
   a controller configured to:
      receive allocation information from the serving base station, the allocation information indicating which time slots are currently allocated for downlink transmission from the serving base station and which time slots are currently allocated for uplink transmission to the serving base station, wherein any given time slot is allocated for either uplink transmission to or downlink transmission from the serving base station, but not both;
      predict a handover delay between the mobile station and the target base station based on the allocation information; and
      reserve resources at the target base station, for use by the mobile station, based on the predicted handover delay, and wherein the controller comprises one or more processors that control the operation of the serving base station according to program instructions stored in memory.

24. The target base station of claim 23 wherein the controller is further configured to receive the allocation information in a handover request from the serving base station.

25. The target base station of claim 23 wherein the controller is further configured to predict a processing component of the handover delay based on a status of a transmit buffer at the serving base station.

26. The target base station of claim 23 wherein the controller is configured to predict an air transmission component of the handover delay by:
   determining a time slot in which the serving base station sends a handover command to the mobile station; and
   predict a subsequent time slot in which the mobile station will confirm handover with the target base station based on the allocation information.

27. The target base station of claim 26 wherein the controller is further configured to reserve the resources at the target base station based on the predicted air transmission component of the handover delay.

* * * * *